(12) United States Patent
Chin et al.

(10) Patent No.: US 7,594,143 B2
(45) Date of Patent: Sep. 22, 2009

(54) ANALYSIS ENGINE FOR ANALYZING A COMPUTER SYSTEM CONDITION

(75) Inventors: Jerry Chin, Cupertino, CA (US);
Jaikrishna Parmar, San Jose, CA (US);
John W. Curry, III, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 347 days.

(21) Appl. No.: 11/590,318

(22) Filed: Oct. 31, 2006

(65) Prior Publication Data

US 2008/0103736 A1 May 1, 2008

(51) Int. Cl.
*G06F 11/00* (2006.01)
(52) U.S. Cl. .......................................... 714/38; 714/30
(58) Field of Classification Search ........................ None
See application file for complete search history.

(56) References Cited

U.S. PATENT DOCUMENTS

| | | | | |
|---|---|---|---|---|
| 6,889,167 B2* | 5/2005 | Curry, III | ..................... | 702/183 |
| 6,959,262 B2* | 10/2005 | Curry, III | ..................... | 702/183 |
| 7,293,201 B2* | 11/2007 | Ansari | ......................... | 714/38 |
| 7,415,632 B1* | 8/2008 | Beale et al. | ................... | 714/15 |
| 7,484,127 B2* | 1/2009 | Babu | ............................ | 714/38 |
| 2004/0153823 A1* | 8/2004 | Ansari | ......................... | 714/38 |
| 2004/0172221 A1* | 9/2004 | Curry, III | ..................... | 702/186 |
| 2004/0230872 A1* | 11/2004 | Mullally et al. | ............... | 714/38 |
| 2006/0242467 A1* | 10/2006 | Dayen et al. | .................. | 714/38 |

\* cited by examiner

*Primary Examiner*—Christopher S McCarthy (57) ABSTRACT

A computer-executable method for analyzing a condition of a computer system comprises executing an operating system on a processor according to an operating system image resident in a memory, and executing an analysis engine independently of the operating system on the processor in co-existence with the operating system. The analysis engine is enabled complete access to information relating to the processor and the operating system. The operating system is prevented access to the analysis engine.

18 Claims, 9 Drawing Sheets

ANALYSIS ENGINE FOR ANALYZING A COMPUTER SYSTEM CONDITION

BACKGROUND

Business success of an enterprise can be highly dependent upon availability of information technology (IT) resources. System downtime can be very expensive, for some business organization in the ranges of millions of dollars per hour. Thus when a System Crash occurs, business success can be highly dependent on performance that can be measured in metrics such as time-to-recovery and time-to-problem-resolution. A conventional system crash analysis paradigm includes a dump of system information, reboot and recovery of the system, then analysis of the dump. The dump analysis generally occurs long after the crash and recovery and is performed by persons with expertise in software and/or hardware of the crashed system. The dump files are commonly transferred to experts at a service organization of a supplier for the crashed system, adding a long delay to the time-for-problem-resolution, due to logistics involved in transferring the dump files of the service organization. In common conditions, the transfer can take hours, days, or even weeks since some of dumps are up to Gigabytes in size, resulting in delay for mailing, handling, and receiving a dump tape.

System crashes can be considered to fall into three main categories including operating system crashes, hardware machine checks, and hung systems. Operating system crashes and hardware machine checks are commonly addressed by a system memory dump, also called a core dump. Memory dumps can take a very long time to perform due to ever-increasing maximum memory configurations, up to one terabyte for large servers and expected to rise to eight terabytes in the near future. After a system crash, acquisition of the memory dump can greatly slow system time-to-recovery, because the memory dump process is slow and time consuming. Some information technology (IT) system users, due to business pressures, now eliminate acquisition of memory dumps after a system crash to accelerate system time-to-recovery, a practice that increases business risk because the problem can recur since the root cause of the system crash is not determined. Failure to obtain the memory dump results in no data for problem analysis.

A hardware crash can be caused by either a hardware error or software passing an invalid address to the hardware. A dump-and-then-analyze paradigm generally demands that all possible data is dumped because the information useful for a particular problem analysis is typically unforeseen and unforeseeable. Therefore, a hardware crash typically demands both a hardware crash dump file and a system memory dump file for suitable analysis, resulting in a long time-to-recover because system memory dumps are large and take a long time to perform. Field data from users with large IT installations indicate that a high percentage of hardware crashes do not result from data addressing related failures. Accordingly, for many or most hardware crashes, a system memory dump is a waste of time.

SUMMARY

An embodiment of a computer-executable method for analyzing a condition of a computer system comprises executing an operating system on a processor according to an operating system image resident in a memory, and executing an analysis engine independently of the operating system on the processor in co-existence with the operating system. The analysis engine is enabled complete access to information relating to the processor and the operating system. The operating system is prevented access to the analysis engine.

BRIEF DESCRIPTION OF THE DRAWINGS

Embodiments of the invention relating to both structure and method of operation may best be understood by referring to the following description and accompanying drawings.

DETAILED DESCRIPTION

An Independent Diagnostic Engine for Analysis (IDEAL) enables an independent and uncompromised diagnostic engine for problem analysis. The diagnostic analysis engine defines a framework and an architecture for performing problem diagnosis from outside of a crashed environment. The analysis engine runs from outside of the crashed environment, but has full access to the crashed environment for analysis. The analysis engine is configured to have access to complete information relating to computer system hardware and the operating system. An initialization procedure grants the analysis engine full access to the hardware and the operating system environment, creating co-existing operating entities in the form of the analysis engine and a production operating system environment that run on the same hardware. The analysis engine can be continually enabled or activated and ready to intervene when an intervention condition arises so that the analysis engine has the ability to perform instantaneous and independent analysis of the crashed environment.

A computing or data processing system implements an Independent Diagnostics Engine for Analysis (IDEAL) that analyzes system crashes as the crash occurs. The analysis is performed while the operating system image remains resident in memory. The IDEAL enables replacement of a traditional dump-and-then-analysis paradigm with an analyze-and-not-dump paradigm, improving dramatically both system-time-to-recovery and time-to-problem-resolution for system crash analysis. The IDEAL enables live and independent analysis of hung systems, eliminating the need to perform lengthy system memory dumps. The Independent Diagnostics Engine for Analysis (IDEAL) is an independent software entity that operates from outside of the operating system environment and co-exists with the production operating system. The IDEAL includes an analysis engine that is independent and separate from a crashed environment and therefore ensures that the crashed environment does not compromise analysis engine integrity. The analysis engine also has the ability to perform instantaneous and independent analysis of the crashed environment at the time of the system crashes. The analysis engine is configured to have access to all information relating to the hardware and operating system environment. IDEAL initialization grants the analysis engine complete access to the hardware and operating system environment by creating the analysis engine which co-exists with a production operating system entity wherein both the analysis engine and the production operating system environment run on the same hardware. The analysis engine is "always on" and ready to intervene when appropriate.

Figure 1:
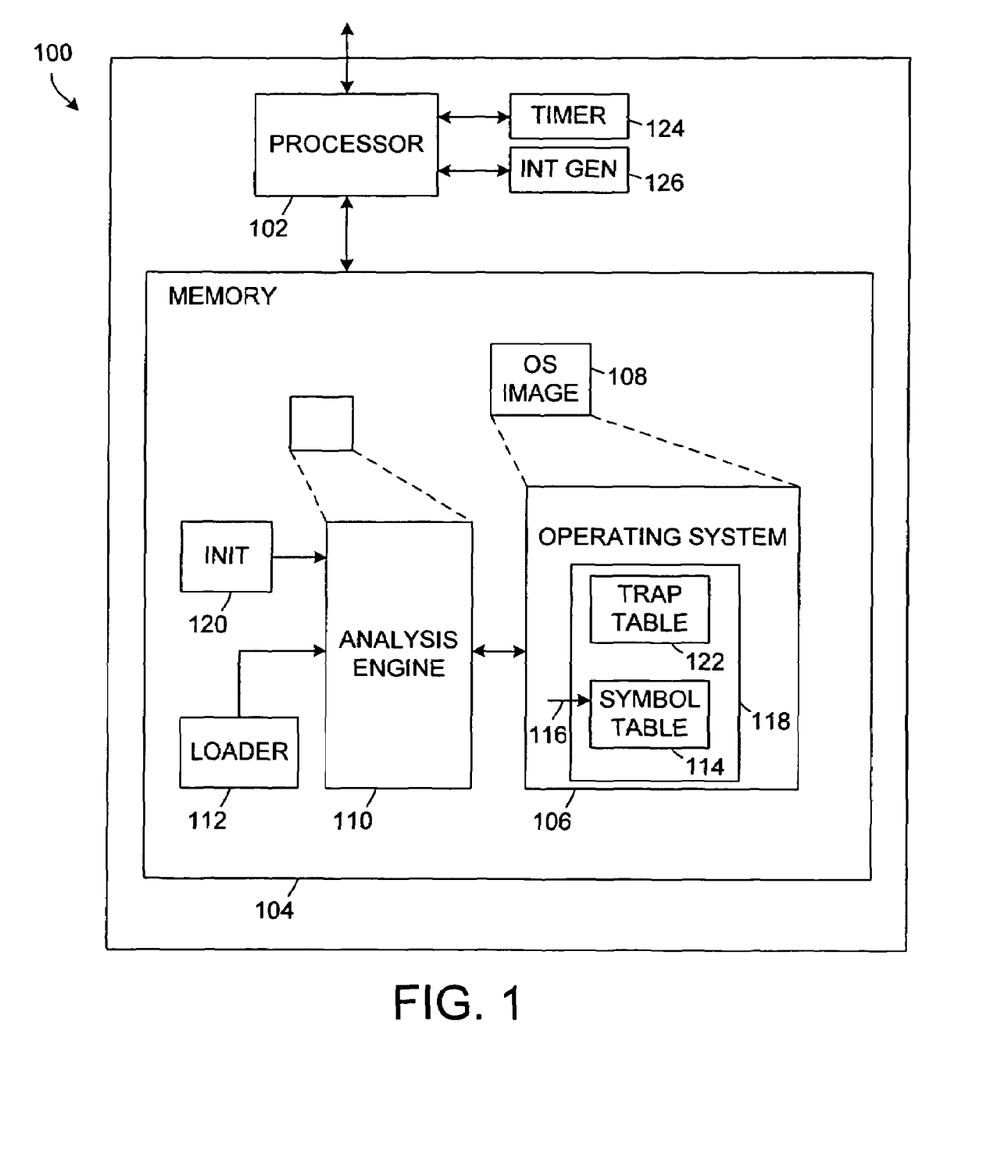
FIG. 1 is a schematic block diagram illustrating an embodiment of a computer system adapted for analysis of various crash conditions.

Referring to FIG. 1, a schematic block diagram illustrates an embodiment of a computer system 100 adapted for analysis of various crash conditions. The computer system 100 comprises a processor 102 and a memory 104. An operating system 106 can execute on the processor 102 as directed by an operating system image 108 that is resident in the memory 104. The computer system 100 further comprises an analysis engine 110 that is executable independently of the operating system 106 on the processor 102 in co-existence with the operation system 106. The analysis engine 110 can analyze conditions of the computer system 100 and is granted complete access to information relating to the processor 102 and the operating system 106. In contrast, access of the operating system 106 to the analysis engine 110 is prohibited or denied.

The analysis engine 110 is configured for analyzing a system crash instantaneously and independently of the operating system 106 while the operating system image 108 remains resident in the memory 104.

To create intelligence in the analysis engine 110, the computer system 100 can include a modified system loader 112 that first loads the analysis engine 110 into memory 104, before the production operating system 106 is loaded. For example, the analysis engine 110 has detailed information about the operating system 106 including data structures, data locations and the like, and is loaded into a memory area that is not used by the operating system 106. The symbol table 114 of the loaded production operating system 106 is also made to be memory resident. The loader 112 then passes the pointer 116 of symbol table 114 to the analysis engine 110 during initialization, giving the analysis engine 110 full information relating to a process for examining the operating system data structures in memory, entry-by-entry, which may be called "walking" the data structures such as the symbol table 114. The analysis engine 110 is thus loaded prior to operating system loading and booting and has control of the trap vector table 122. To protect the analysis engine 110 and symbol table 114 from corruption by the operating system, analysis engine 110 and symbol table 114 memory pages can be "hidden" from the production operating system.

During the operating system boot, or while the operating system 106 is running, any traps or interrupts that occur are examined by the analysis engine 110 to determine how the traps or interrupts are to be handled.

Accordingly, the computer system 100 further can comprise a system loader 112 configured to initialize the computer system 100, including the analysis engine 110. The system loader 112 can operate, for example, by loading the analysis engine 110 into the memory 104, then loading the operating system image 108 into the memory 104. The system loader 112 loads a symbol table 114 of the operating system 106 into the memory 104 as memory resident. The system loader 112 passes a pointer 116 of the symbol table 114 to the analysis engine 110 so that the analysis engine 110 is granted full information relating to operating system data structures 118 in the memory 104.

In a particular embodiment, the system loader 112 can be configured to prevent operating system access to the analysis engine 110 by hiding memory pages allocated to the analysis engine 110 and the symbol table 114 from the operating system 100.

The computer system 100 implements a unique approach for transfer of execution control between the two distinct and independent software domains—the production operating system environment and the independent analysis engine 110—by modifying the production operating system trap table 122 during the analysis engine 110 initialization. The analysis engine 110, through access to the production operating system symbol table 114, has sufficient information to find the location of the production operating system trap table 122. By walking the operating system trap table 122 in memory 104 and modifying the pointer 116 to specific operating system trap handler code, the analysis engine 110 is able to change functionality of the operating system trap handling, without the operating system detecting the change in functionality. The changes can be implemented on a memory resident copy of the production operating system 106, before the operating system is initialized.

Accordingly, in some embodiments the computer system 100 can further comprise an initialization process 120 that is executable on the processor 102 and configured for loading the analysis engine 110 into the memory 104, then loading a symbol table 114 of the operating system 106. The initialization process 120 accesses a trap table 122 of the operating system 106 located according to information in the symbol table 114, and modifies entries of the operating system trap table 122 in a memory-resident operating system image 108. The initialization process 120 initializes the operating system 106 after modifying the entries in the operating system trap table 122.

Functionality of the illustrative operating system 100 and analysis engine 110 enables creation of several diagnostic capabilities. Various embodiments of the initialization process 120 can support example functionality. For example, the initialization processor 102 can support a break instruction by modifying a break instruction entry of the operating system trap table 122 to point to a program code that activates the analysis engine 110. The analysis engine 110 detects an operating system crash and inserts a break instruction in an operating system code path for an operating system crash handling procedure.

Accordingly, by modifying trap table entries for the "Break" instruction and for Hardware Machine Check, the analysis engine 110 can wake up or activate, whenever a "Break" instruction is called or a Machine Check occurs. To transfer control execution when an operating system Crash occurs, the analysis engine 110 inserts a "Break" instruction in the production operating system code path for the operating system crash procedure. The analysis engine 110 uses the operating system symbol table 114 to find the memory location of the appropriate operating system procedure.

In another example functionality, the initialization processor 102 can modify a condition entry of the operating system trap table 122 to point to a program code that activates the analysis engine 110. The analysis engine 110 can analyze a condition associated with the condition according to predetermined condition analysis rules and can update the condition analysis rules according to detected new aspects of the condition.

Conventional system crash analysis techniques are inefficient in addressing system hangs. Conventional system hang analysis suffers from limitations similar to those affecting traditional operating system crash analyses, generally involving a lengthy memory dump and then a long delay in delivering the dump to a service provider with expertise in the particular crashed system. The dump-and-then-analyze paradigm has a very long time-to-recover and time-to-problem-resolution. The illustrative system 100 and associated operating techniques enable a live-analysis paradigm that substantially improves analysis efficiency. Live-analysis is performed by the analysis engine 110 outside of the operating system environment because, due to the hung state of the system, the operating system environment is already compromised. The analysis engine 110 enables live analysis of the hung system state, enabling determination of the root cause of the problem, thereby making performance a full System Memory Dump no longer necessary. Accordingly, the illustrative computer system 100 and analysis engine 110 enable substantial improvement in system time-to-recovery and time-to-problem-resolution by avoiding time-consuming system memory dump acquisition and eliminating lengthy logistics delays for delivering large dump files to a service provider. Accordingly, in some embodiments the computer system 100 can comprise a timer 124 and in interrupt generator 126. The timer 124 can be operated to time an interval. The interrupt generator 126 can be operated to generate an interrupt when the interval exceeds a predetermined system hang threshold, activating the analysis engine 110 in response to the interrupt.

Figure 2A:
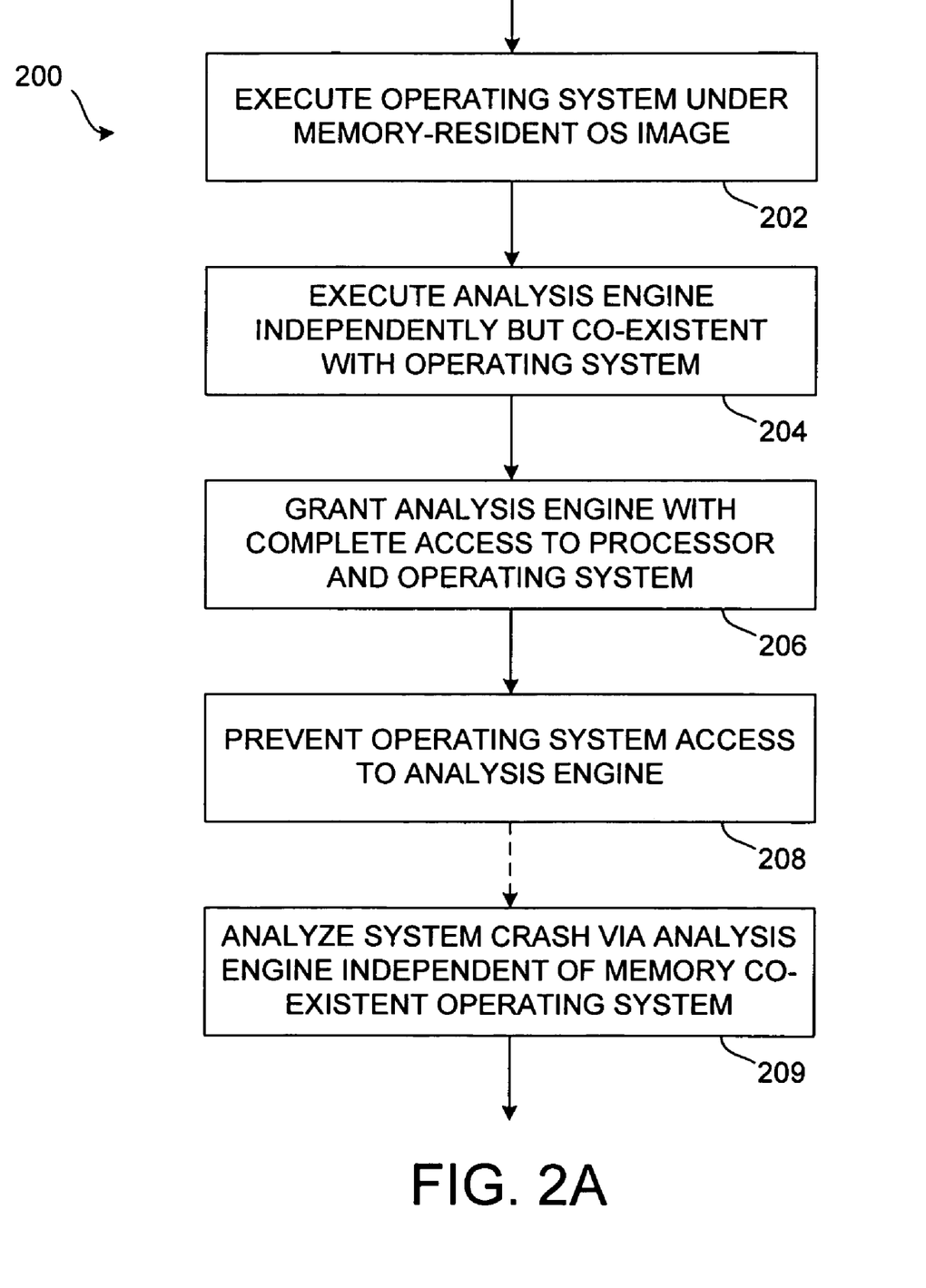
FIGS. 2A through 2H are flow charts that depict several aspects and embodiments of a computer-executable method for analyzing a condition of a computer system.

Referring to FIGS. 2A through 2H, flow charts depict several aspects and embodiments of a computer-executable method 200 for analyzing a condition of a computer system. As shown in FIG. 2A, the method 200 comprises executing 202 an operating system on a processor under control of an operating system image that is resident in a memory. An analysis engine simultaneously executes 204 independently of the operating system on the processor in co-existence with the operating system. The analysis engine is enabled 206 with complete access to information relating to the processor and the operating system. The method 200 is adapted so that operating system access to the analysis engine is prevented 208.

The analysis engine can analyze 209 a system crash instantaneously and independently of the operating system while the operating system image remains resident in the memory.

Figure 2B:
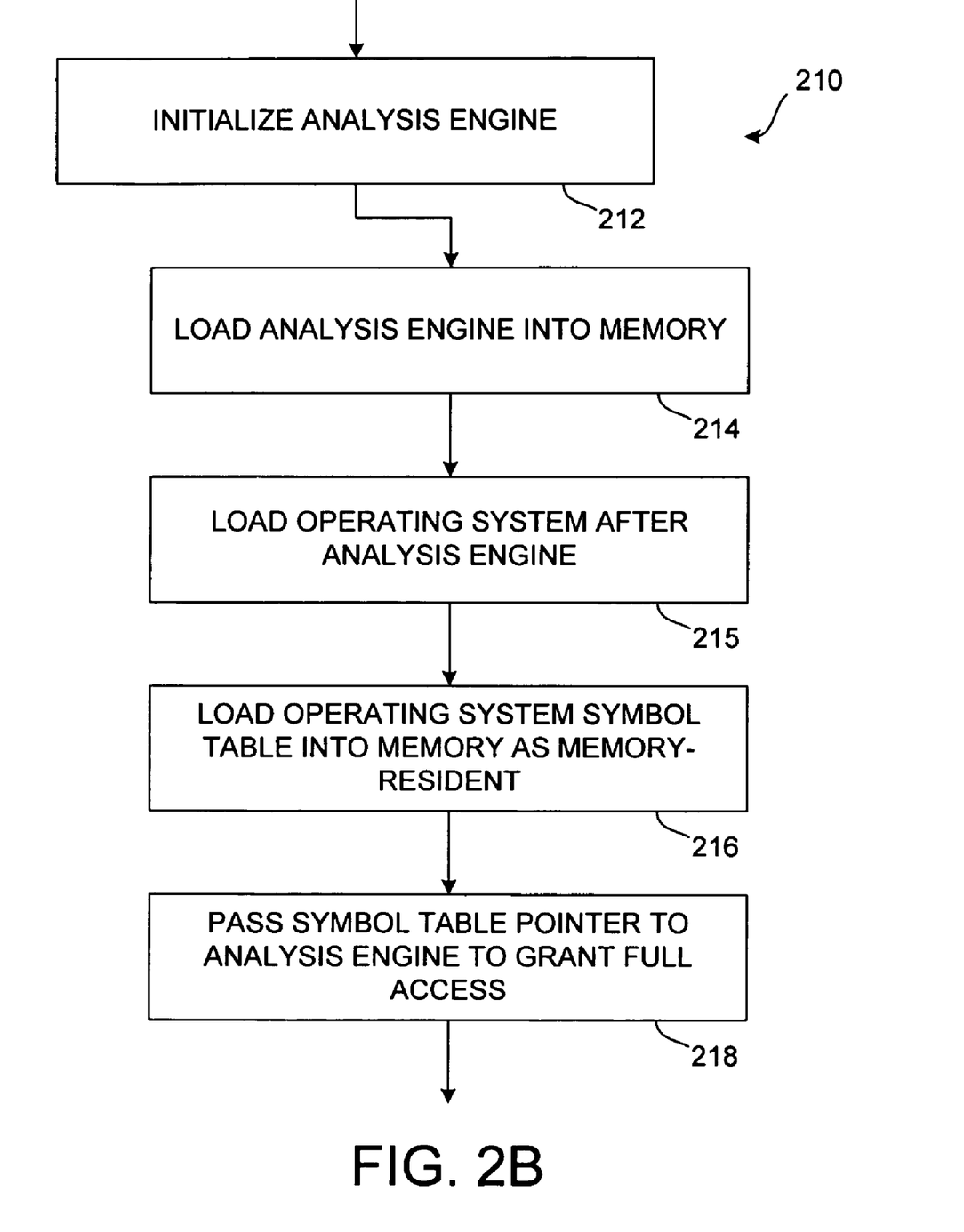

Referring to FIG. 2B, in some embodiments a method 210 can comprise initializing 212 the analysis engine whereby the analysis engine is granted complete access to information relating to the processor and the operating system. Initialization 212 can comprise loading 214 the analysis engine into the memory, then loading 215 the operating system image into the memory subsequent to loading of the analysis engine. A symbol table of the operating system can be loaded 216 into the memory as memory resident. A pointer of the symbol table is passed 218 to the analysis engine whereby the analysis engine is granted full information relating to operating system data structures in the memory.

Access of the operating system to the analysis engine can be prevented by hiding memory pages allocated to the analysis engine and the symbol table from the operating system. In a particular embodiment, the memory pages allocated to the analysis engine and the symbol table can be hidden from the operating system by marking the allocate memory pages as firmware pages in a memory map whereby the operating system cannot access the allocated memory pages. For example, in the case of an Invalid Page Fault (IPF), the loader can mark the appropriate pages as "firmware pages" in the Extensible Firmware Interface (EFI) memory map, so the operating system does not register or have information concerning the memory pages.

Figure 2C:
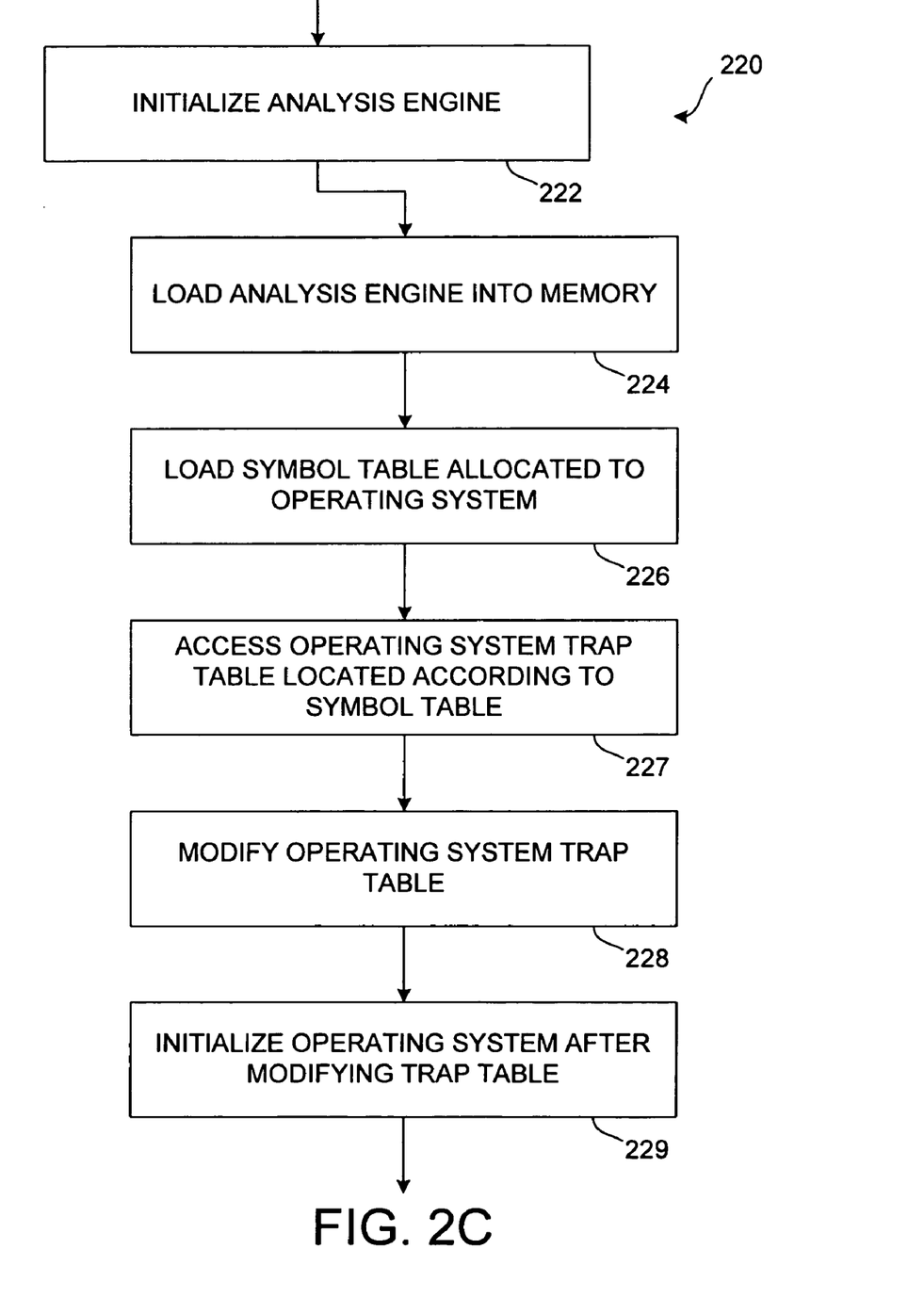

Referring to FIG. 2C, the analysis engine can be granted 220 complete access to information relating to the processor and the operating system by initializing 222 the analysis engine. In another illustrative embodiment, initialization 222 can comprise loading 224 the analysis engine into the memory and loading 226 a symbol table allocated to the operating system. A trap table of the operating system which is located according to information in the symbol table is accessed 227. Entries of the operating system trap table in a memory-resident operating system image are modified 228. The operating system is initialized 229 after modifying the entries in the operating system trap table.

Figure 2D:
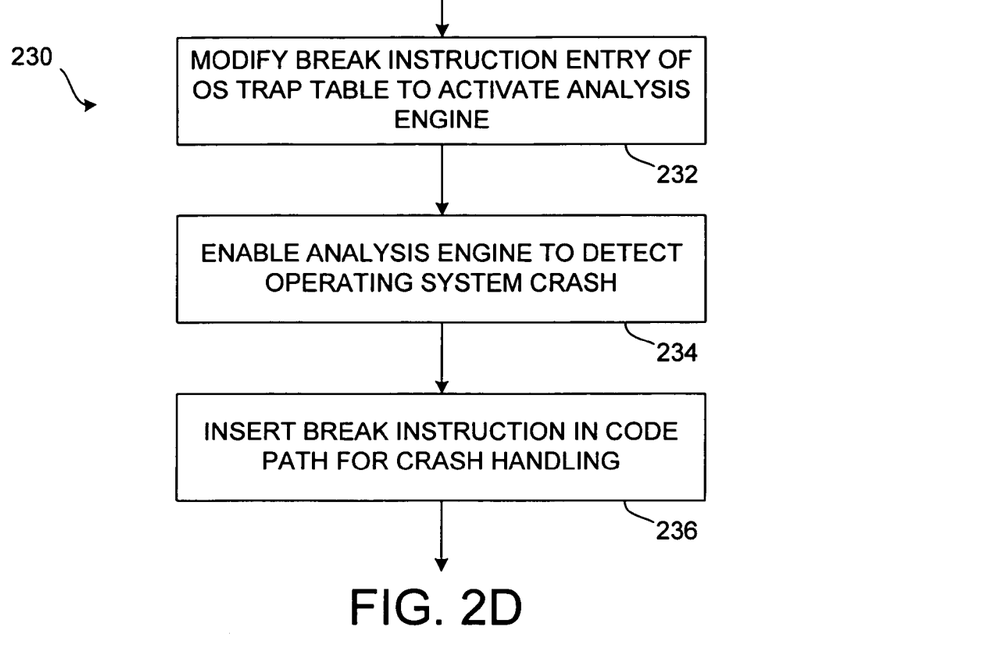
Figure 2E:
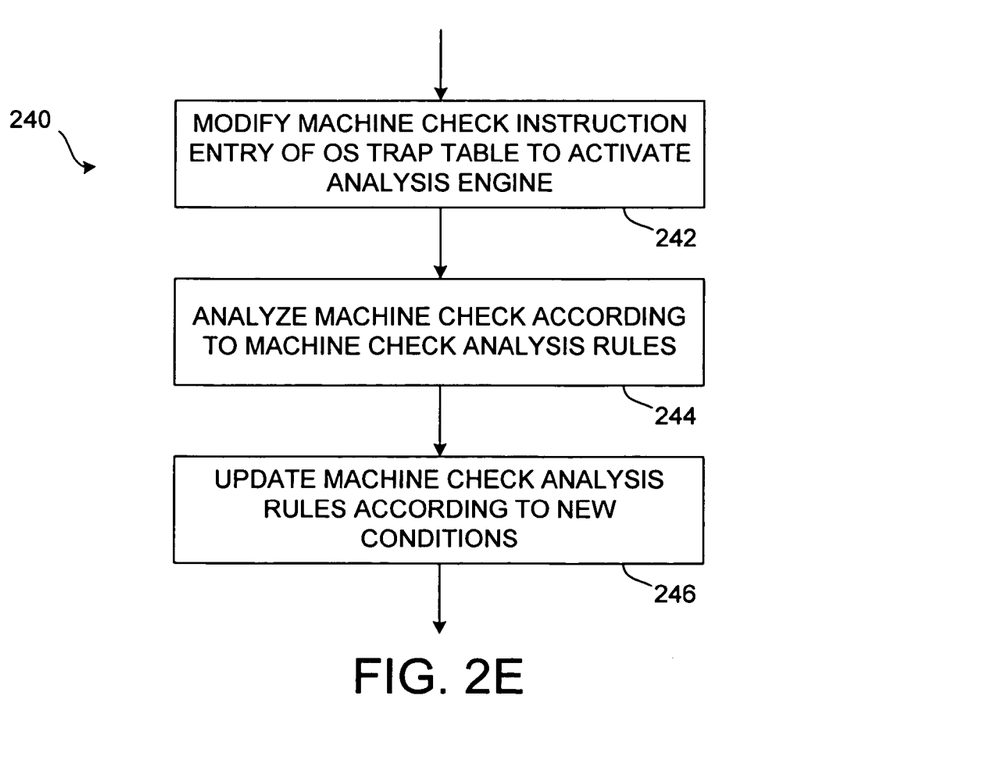
Figure 2F:
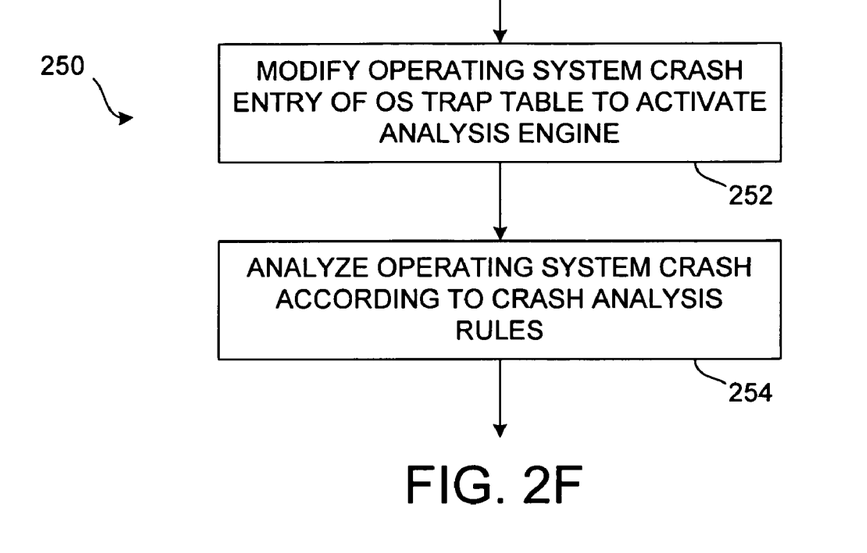
Figure 2G:
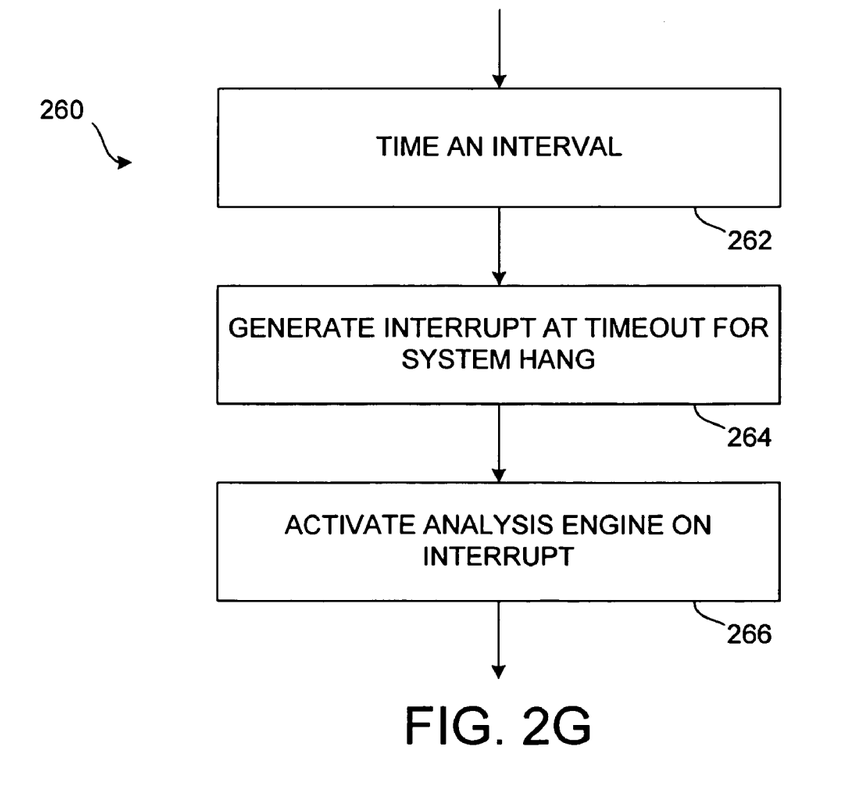
Figure 2H:
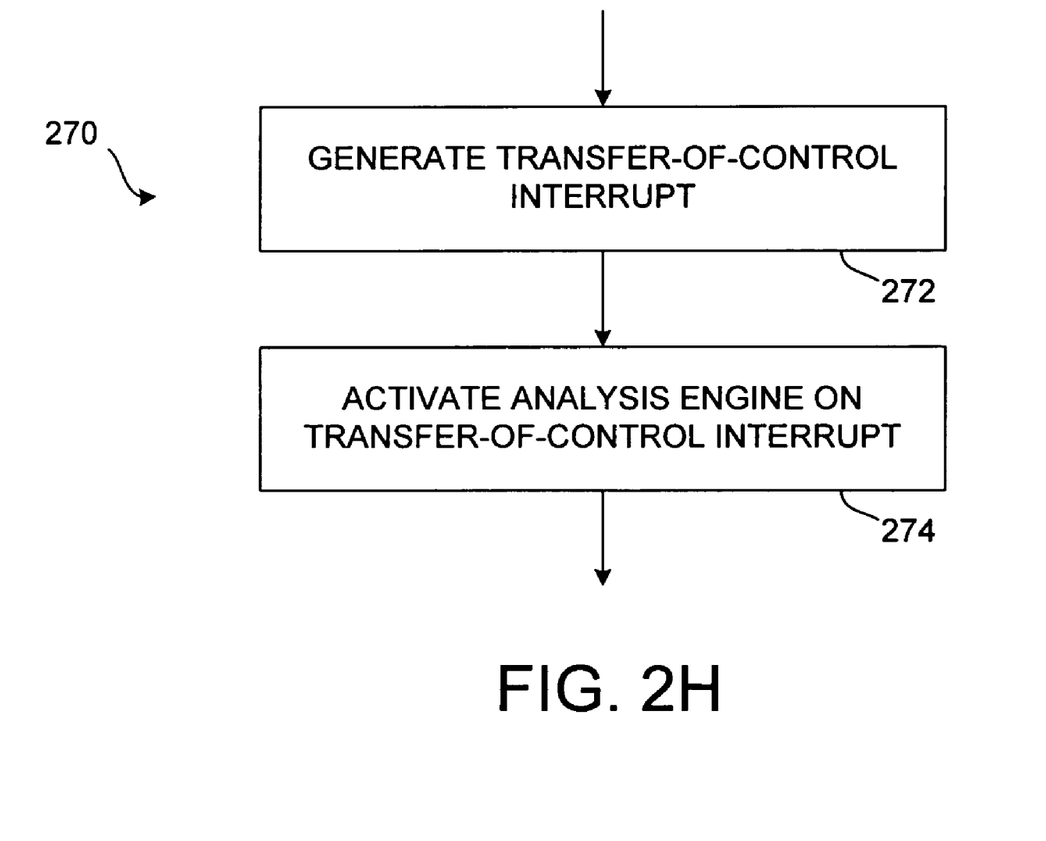

Referring to FIG. 2D, a break instruction can be performed 230 by modifying 232 a break instruction entry of the operating system trap table to point to a program code that activates the analysis engine thereby enabling 234 the analysis engine to detect an operating system crash. The analysis engine inserts 236 a break instruction in an operating system code path for an operating system crash handling procedure.

The computer system and analysis engine disclosed herein can support instantaneous Machine Check Analysis (MCA). The analysis engine alters the machine crash routine of the operating system kernel so that an operating system crash invokes the analysis engine for analysis of the hardware problem. The analysis engine analyzes the machine check via an inference engine with specific Machine Check Analysis (MCA) rules and can update the Machine Check Analysis rules for new conditions and cases. The analysis engine can skip dumping of system memory for non-address-related Machine Checks, substantially improving system recovery time. For example, referring to FIG. 2E a machine check instruction can be performed 240 by modifying 242 a machine check instruction entry of the operating system trap table to point to a program code that activates the analysis engine so that the analysis engine analyzes 244 a machine check according to predetermined machine check analysis rules. The analysis engine can update 246 the machine check analysis rules according to detected new conditions.

The computer system and analysis engine disclosed herein can also support operating system crash analysis. The analysis engine alters the operating system crash routine of the kernel so that an operating system crash invokes the analysis engine for operating system crash analysis. The analysis engine can analyze the operating system crash via an inference engine with specific operating system analysis rules. Thus, referring to FIG. 2F an operating system crash can be addressed 250 by modifying 252 an operating system crash entry of the operating system trap table to a point to program code that activates the analysis engine. The analysis engine can analyze 254 an operating system crash according to predetermined operating system crash analysis rules.

The illustrative computer system and analysis engine can also support systems hang detection and analysis. The analysis engine design can include a capability to set timers that trigger when the system hangs, for example when the timer exceeds an established threshold via timer interrupt. The illustrative computer system can detect a hang condition of the system and automatically launch the analysis engine to assess the condition. Thus, referring to FIG. 2G, in some embodiments system hang detection and analysis can be performed 260 comprising timing 262 an interval and generating 264 an interrupt when the interval exceeds a predetermined system hang threshold. The analysis engine is activated 266 upon generation of the interrupt.

The illustrative system can also be configured for a live system debugging functionality. The analysis engine can have the ability to perform live analysis of a hung system. A Transfer of Control (TOC) interrupt can be modified to wake up the analysis engine when a TOC event happens. In contrast, a traditional system responds to the TOC event by re-booting the system. The illustrative computer system creates the ability for a separate and independent entity outside of the operating system environment to perform expert examination of a live system to determine the cause of the system problem. Accordingly, referring to FIG. 2H in some embodiments system live system debugging can be performed 270 comprising generating 272 a transfer-of-control (TOC) interrupt and activating 274 the analysis engine upon generation of the (TOC) interrupt.

The trap/interrupt handling elements of a typical computer architecture enables privileged code to run on occurrence of some predefined conditions. The conditions can include hardware events and software-generated events. The trap/interrupt-based functionality can be exploited by the illustrative computer system and analysis engine and associated methods to facilitate error detection, and data collection and analysis associated with to errors.

In a typical implementation, the analysis engine passes non-error traps to a normal operating system vector table. For traps relating to errors or other unusual conditions, the analysis engine can examine trap information in combination with information accessible from operating system data structures in memory and use the information for error isolation. In some implementations, an operating system panic condition can cause forced traps to the analysis engine. For some architectures, process time-slice events can cause non-error traps that can be used by the analysis engine to monitor hardware and operating system parameters at run-time. For example, if a processor has a time-slice trap, the analysis engine can determine whether the processor is idle by examining the process data structure associated with the process currently run on the processor. If the processor is idle, the analysis engine can trap to check for errors. When checking is complete, the processor returns to an idle loop, enabling the analysis engine to reduce performance impact on the operating system.

Figure 3A:
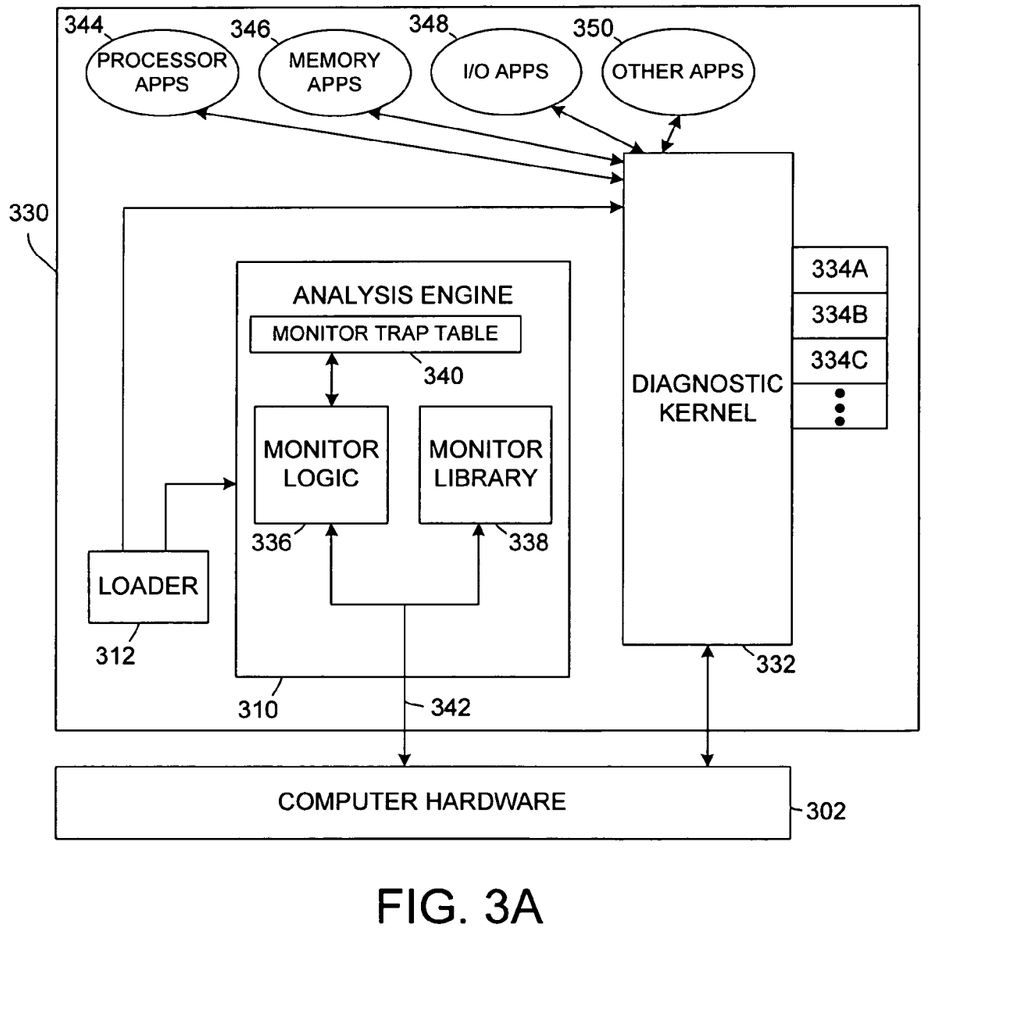
FIGS. 3A and 3B are schematic block diagrams showing an embodiment of an analysis engine configured to perform diagnostic functionality.

Referring to FIG. 3A, a schematic block diagram illustrates an embodiment of an analysis engine 310 configured to perform diagnostic functionality. In operation, a loader program called a loader 312 can run initially. The loader 312 then finds the analysis engine 310 from the boot device such as a disk and launches the analysis engine 310. The analysis engine 310 initializes and can be implemented to identify the model of the computer upon which the analysis engine 310 is executing. For example, a particular analysis engine 310 can be compiled for particular machine architecture. The analysis engine 310 then requests the loader 312 to load an appropriate library module for the computer model. The library has model-specific information about the computer that is monitored, for example detection and isolation routines pertinent to various hardware errors. The library can also have detailed information about the operating system.

The analysis engine 310 generally has functionality based on access to various operating system details such as the layout of process data structures, location at which the operating system is loaded, and the like. The symbol table of the operating system is also loaded and used by the analysis engine 310 so that the analysis engine 310 has access to locations of the fixed operating system data structures. The locations of most run-time operating system structures can be deduced from locations of particular fixed structures. Otherwise, the operating system can pass the locations to the analysis engine 310 during operating system initialization, or at the structure creation time. In some embodiments, the analysis engine 310 can install a trap vector table dedicated to the analysis engine as the table for usage and return control to the loader 312.

The illustrative diagnostic environment includes computer hardware 302 under diagnostic, and a diagnostic exerciser 330. The diagnostic exerciser 330 can include the loader module 312, which loads components of diagnostic exerciser 330 into memory upon system initiation. The diagnostic exerciser 330 further includes a diagnostic kernel 332 that represents the kernel of a non-production operating system, such as a non-production Windows™ or Linux operating system, which is allocated for diagnostic functionality. The diagnostic kernel 332 can have multiple drivers 334A, 334B, 334C, enabling the diagnostic exerciser 330 to obtain information pertaining to associated input/output (I/O) devices. When an I/O device fails, the associated driver can gather information from the card/device electronics to enabling the diagnostic exerciser 330 to analyze the error.

The diagnostic kernel 332 is generally configured to differ from the kernel of the corresponding production operating system only minimally so that the computer hardware 302 is stressed similarly to the stress imposed by computer hardware 302 in common operations. However, some modifications are included to enable the analysis engine 310 to perform functions of monitoring, error detection, and error analysis. In one embodiment, kernel 332 is modified to enable initialization of the analysis engine 310 and the drivers 334A, 334B, 334C, to facilitate communication with the analysis engine 310 during execution of diagnostic applications, and to enable additional diagnostic capabilities such as processor affinity, physical memory allocation, and the like.

Diagnostic exerciser 330 also includes the analysis engine 310, which includes monitoring software that detects and analyzes errors. Analysis engine 310 communicates with the monitor kernel 332. The analysis engine 310 and kernel 332 can be supplied as separate binary files so that the analysis engine 310 is independent of the operating system. Thus, the analysis engine 310 runs with rather than under the kernel 332. The analysis engine 310 can be loaded into a memory location that is not used by kernel 332 to avoid unintended alteration of analysis engine 310 by kernel 332. When an error occurs with kernel 332, analysis engine 310 attempts to analyze the error and isolate the problem to a field replaceable unit (FRU) or a list of potential malfunctioning FRUs.

The illustrative analysis engine 310 has three main modules including monitor logic 336, monitor library 338, and monitor trap table 340. Monitor logic 336 can be architecture-dependent according to the specific architecture and the type of box of computer hardware 302 as determined through information obtained via link 342, enabling appropriate monitor library 338 to be loaded so that the monitor library 338 is thus both architecture-specific and box-specific.

Monitor trap table 340 is the trap table that controls operations during execution of diagnostic applications. One function of analysis engine 310 is control of the trap handler. A trap encountered by kernel 332 can be examined by analysis engine 310, which can determine whether to handle the trap or pass the trap to the operating system for handling. The operating system also has a trap table can be granted control only if analysis engine 310 directs the operating system to handle a particular trap whereby control passes to the appropriate offset in the trap table of the operating system to handle the trap. Thus, from the perspective of the operating system, the operating system trap table handles traps that the operating system processes in a transparent manner. Other traps are retained and handled by monitor trap table 340.

Applications 344, 346, 348, and 350 are diagnostic applications that can execute under kernel 332 to stress specific portions of computer hardware 302. Processor applications 344 are configured for processor testing. Memory applications 346 test the memory. I/O applications 348 test I/O subsystems. Other applications can test other subsystems and/or aspects of computer hardware 302 and/or the operating system and are shown generically as applications 350.

Figure 3B:
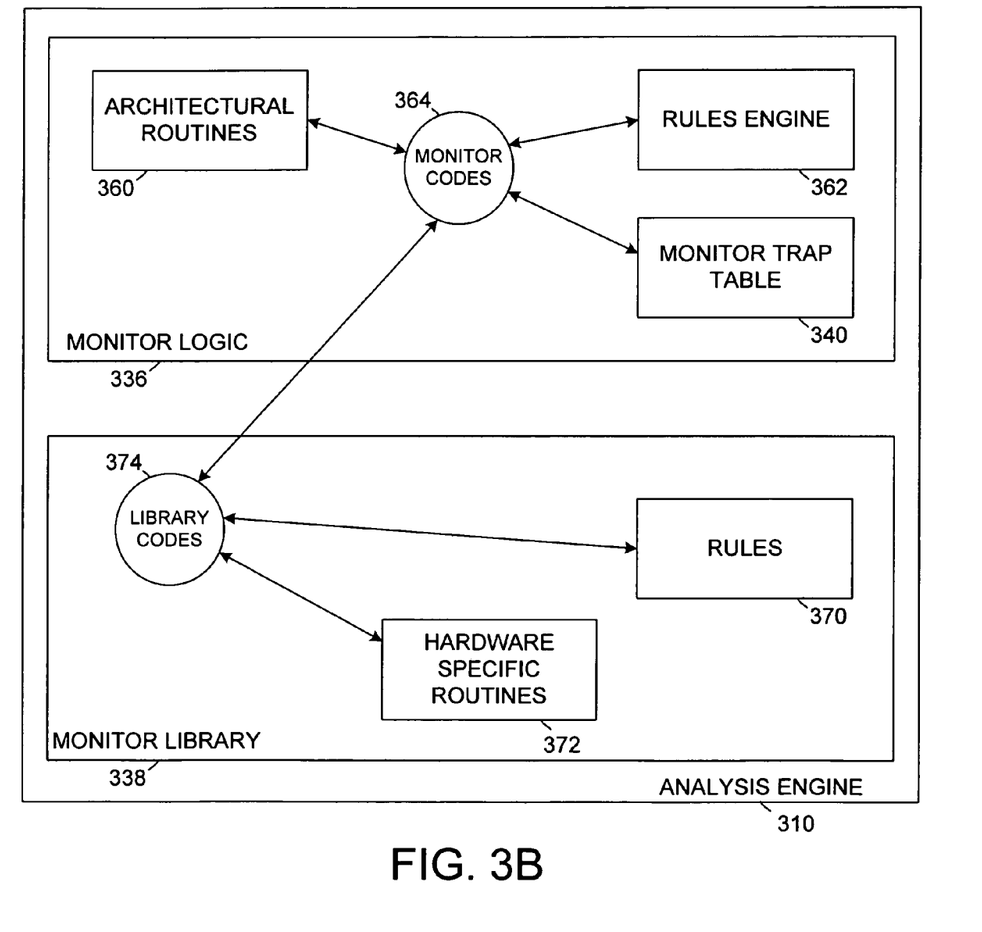

Referring to FIG. 3B, a block diagram illustrates an embodiment of the analysis engine 310 in additional detail.

Monitor logic 336 includes, in addition to core monitor codes 364, architecture routines 360 and rules engines 362. Architecture routines 360 and rules engines 362 are shown separate from monitor logic 336 to facilitate understanding, but can and typically are part of monitor logic 336. Architecture routines 360 are routines that perform standard tasks based on architectural level, for example saving of contents of all general registers. The size and number of general registers depends on the particular architecture.

Monitor trap table 340 is the functional trap handler during execution so that a trap/interrupt by kernel 332, whether or not expected, forces execution to the analysis engine 310. Thus, the analysis engine 310 is immediately informed of error traps, enabling analysis engine 310 to stop all other processors and collect state information. For non-error traps, analysis engine 310 can collect selected statistics and continue with basic functionality of the trap, eventually returning to the operating system.

The trap handler for analysis engine 310 can be organized for kernel 332 to specify, for non-error traps, the routine for the analysis engine 310 to run. Specification of the routine occurs during kernel initialization, once the kernel 332 has passed control to the analysis engine 310. Otherwise, the kernel 332 uses a default trap handler.

Some error traps can be handled in a special manner. For example, for severe hardware errors, significant software errors, and hardware resets, the hardware can automatically branch to firmware routines. For example, High Priority Machine Checks (HPMCs), Low Priority Machine Checks (LPMCs), and Transfer of Controls (TOCs) can cause the hardware to automatically branch to firmware routines. The firmware saves the register state of the processor and clears error conditions. If an appropriate trap handler routine in analysis engine 310 is properly initialized, the firmware routine can branch to the handler of analysis engine 310 and analysis engine 310 can begin analysis.

Rules engine 362 of monitor logic 336 includes a set of routines to interrogate monitor library 338 to locate a FRU for detecting and error condition. Rules engine 362 can be used to interpret rules 370, and can also include functionality such as determining rules are used for error analysis and determining when error analysis complete. A library may be included for each type of "box" for a particular architecture. The library can contain, among other things, rule functions for analyzing collected data to analyze an error condition.

Monitor library 338 includes, in addition to core library codes 374, rules 370 and hardware-specific routines 372. Rules 370 represent rules specific to the architecture under consideration and are used for error analysis. Rules 370 have inferences for various error conditions and can resolve the error to the failing FRU. Hardware-specific routines 372 include routines specific to a particular box to facilitate, for example, gathering of information from the specific box.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A computer-executable method for analyzing a condition of a computer system comprising:
   executing an operating system on a processor according to an operating system image resident in a memory;
   executing an analysis engine independently of the operating system on the processor in co-existence with the operating system;
   enabling the analysis engine complete access to information relating to the processor and the operating system;
   preventing operating system access to the analysis engine; and
   initializing the analysis engine comprising:
      loading the analysis engine into the memory;
      loading a symbol table of the operating system;
      accessing a trap table of the operating system located according to information in the symbol table;
      modifying entries of the operating system trap table in a memory-resident operating system image; and
      initializing the operating system after modifying the entries in the operating system trap table.

2. The method according to claim 1 further comprising:
   analyzing a system crash using the analysis engine instantaneously and independently of the operating system while the operating system image remains resident in the memory.

3. The method according to claim 1 further comprising:
   initializing the analysis engine whereby the analysis engine is granted complete access to information relating to the processor and the operating system comprising:
      loading the analysis engine into the memory;
      loading the operating system image into the memory subsequent to loading of the analysis engine;

loading a symbol table of the operating system into the memory as memory resident; and passing a pointer of the symbol table to the analysis engine whereby the analysis engine is granted full information relating to operating system data structures in the memory.

4. The method according to claim 3 further comprising:

preventing operating system access to the analysis engine comprising:

hiding memory pages allocated to the analysis engine and the symbol table from the operating system.

5. The method according to claim 4 further comprising:

hiding memory pages allocated to the analysis engine and the symbol table from the operating system comprising:

marking the allocate memory pages as firmware pages in a memory map whereby the operating system cannot access the allocated memory pages.

6. The method according to claim 1 further comprising:

modifying a break instruction entry of the operating system trap table to point to a program code that activates the analysis engine;

enabling the analysis engine to detect an operating system crash; and enabling the analysis engine to insert a break instruction in an operating system code path for an operating system crash handling procedure.

7. The method according to claim 1 further comprising:

modifying a machine check instruction entry of the operating system trap table to point to a program code that activates the analysis engine;

enabling the analysis engine to analyze a machine check according to predetermined machine check analysis rules; and enabling the analysis engine to update the machine check analysis rules according to detected new conditions.

8. The method according to claim 1 further comprising:

modifying an operating system crash entry of the operating system trap table to point to a program code that activates the analysis engine; and enabling the analysis engine to analyze an operating system crash according to predetermined operating system crash analysis rules.

9. The method according to claim 1 further comprising:

timing an interval;

generating an interrupt when the interval exceeds a predetermined system hang threshold; and activating the analysis engine upon generation of the interrupt.

10. The method according to claim 1 further comprising:

generating a transfer-of-control (TOG) interrupt; and activating the analysis engine upon generation of the (TOG) interrupt.

11. A computer system comprising:

a processor;

a memory coupled to the processor;

an operating system executable on the processor according to an operating system image resident in the memory;

an analysis engine executable independently of the operating system on the processor in co-existence with the operation system and adapted for analyzing a condition of the computer system, the analysis engine configured for complete access to information relating to the processor and the operating system with access of the operating system to the analysis engine denied; and initialization process executable on the processor and configured for loading the analysis engine into the memory, loading a symbol table of the operating system, accessing a trap table of the operating system located according to information in the symbol table, modifying entries of the operating system trap table in a memory-resident operating system image, and initializing the operating system after modifying the entries in the operating system trap table.

12. The computer system according to claim 11 further comprising:

the analysis engine configured for analyzing a system crash instantaneously and independently of the operating system while the operating system image remains resident in the memory.

13. The computer system according to claim 11 further comprising:

a system loader configured to load the analysis engine into the memory, load the operating system image into the memory subsequent to loading of the analysis engine, and load a symbol table of the operating system into the memory as memory resident, the system loader further configured to pass a pointer of the symbol table to the analysis engine whereby the analysis engine is granted full information relating to operating system data structures in the memory.

14. The computer system according to claim 13 further comprising:

the system loader further configured to prevent operating system access to the analysis engine by hiding memory pages allocated to the analysis engine and the symbol table from the operating system.

15. The computer system according to claim 11 further comprising:

the initialization processor further configured to modify a break instruction entry of the operating system trap table to point to a program code that activates the analysis engine; and the analysis engine configured to detect an operating system crash and insert a break instruction in an operating system code path for an operating system crash handling procedure.

16. The computer system according to claim 11 further comprising:

the initialization processor further configured to modify a condition entry of the operating system trap table to point to a program code that activates the analysis engine;

enabling the analysis engine to analyze a condition associated with the condition according to predetermined condition analysis rules; and enabling the analysis engine to update the condition analysis rules according to detected new aspects of the condition.

17. The computer system according to claim 11 further comprising:

a timer configured for timing an interval; and an interrupt generator configured to generate an interrupt when the interval exceeds a predetermined system hang threshold and activate the analysis engine in response to the interrupt.

18. An article of manufacture comprising:

a controller usable storage medium having a computable readable program code stored therein for analyzing a condition of a computer system, the computable readable program code further comprising:

said computer readable code configured to cause the controller to execute an operating system on a processor according to an operating system image resident in a memory;

said computer readable code configured to cause the controller to execute an analysis engine independently of the operating system on the processor in co-existence with the operating system;

said computer readable code configured to cause the controller to enable the analysis engine complete access to information relating to the processor and the operating system;

said computer readable code configured to cause the controller to prevent operating system access to the analysis; and said computer readable code configured to cause the controller to initialize the analysis engine comprising:
loading the analysis engine into the memory;
loading a symbol table of the operating system;
accessing a trap table of the operating system located according to information in the symbol table;
modifying entries of the operating system trap table in a memory-resident operating system image; and
initializing the operating system after modifying the entries in the operating system trap table.

* * * * *

UNITED STATES PATENT AND TRADEMARK OFFICE
CERTIFICATE OF CORRECTION

PATENT NO. : 7,594,143 B2  Page 1 of 1
APPLICATION NO. : 11/590318
DATED : September 22, 2009
INVENTOR(S) : Jerry Chin et al.

It is certified that error appears in the above-identified patent and that said Letters Patent is hereby corrected as shown below:

On the Title page, item (75), Inventors, in column 1, line 3, delete "Cupertino," and insert -- Union City, --, therefor.

In column 11, line 50, in Claim 10, delete "(TOG)" and insert -- (TOC) --, therefor.

In column 11, line 52, in Claim 10, delete "(TOG)" and insert -- (TOC) --, therefor.

In column 11, line 65, in Claim 11, before "initialization" insert -- an --.

In column 13, line 11, in Claim 18, delete "analysis;" and insert -- analysis engine; --, therefor.

Signed and Sealed this

Sixteenth Day of November, 2010

David J. Kappos
*Director of the United States Patent and Trademark Office*